July 5, 1927.
H. J. HILLBORN
OUTBOARD MOTOR DRIVE
Filed Sept. 18, 1926
1,634,942
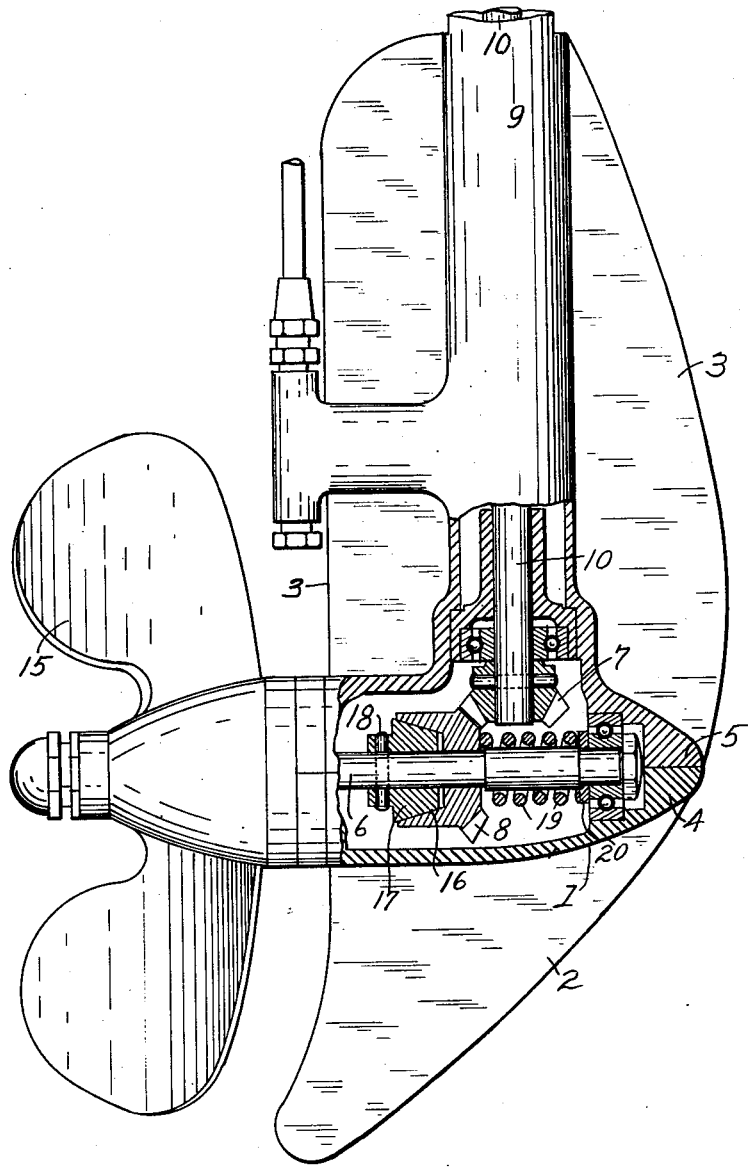
INVENTOR.
Herbert J. Hillborn
BY
Erwin, Wheeler & Woolard
ATTORNEY.

Patented July 5, 1927.

1,634,942

UNITED STATES PATENT OFFICE.

HERBERT J. HILLBORN, OF MILWAUKEE, WISCONSIN, ASSIGNOR TO EVINRUDE MOTOR COMPANY, OF MILWAUKEE, WISCONSIN, A CORPORATION OF WISCONSIN.

OUTBOARD-MOTOR DRIVE.

Application filed September 18, 1926. Serial No. 136,220.

This invention relates to improvements in outboard motor drives.

It is the object of the invention to provide a novel and improved means of incorporating a slip clutch in an outboard motor drive. It is my purpose to incorporate the clutch at a point where a minimum of variation will be required from standard constructions, where the clutch will be protected from injury either by direct blows or by the accumulation of grit or sediment therein, and where the clutch will be comparatively readily accessible for repair if necessary.

It is a further important object of the invention to provide a construction in which a comparatively light spring may be used with the assistance of engine thrust, the arrangement being such that when the clutch is made to slip as by a sudden shock the pressure holding the two parts of the clutch together will immediately be relieved and will not be reestablished until the parts are again in position for normal operation.

The drawing represents the lower or normally submerged portions of an outboard motor, the housing being partially broken away to a vertical axial section to expose the interior construction.

At 1 I have illustrated the usual submerged gear housing which has skeg 2 and fin elements 3 formed integrally therewith for assistance in steering. The gear housing is made in two relatively separable sections 4 and 5 which afford access to the propeller shaft 6 and gears 7 and 8 housed therein. The entire housing is assembled at the lower end of a tubular drive shaft housing 9 in which the drive shaft 10 is rotatable. Gear 7 is mounted at the end of drive shaft 10 and meshes with gear 8 which is carried by the propeller shaft 6 for the actuation of propeller 15.

In accordance with this invention the bevel gear 8 is not made fast to propeller shaft 6 but is loosely mounted thereon, and its hub gear 8 is provided with a conically tapered recess 16, the inner surface of which provides one of the faces of the friction clutch. The other clutch member is a frusto conical block 17 keyed as by pin 18 to the propeller shaft 6. A relatively light spring 19 is wound upon the propeller shaft and is under compression between washer 20 and the loosely mounted hub of gear 8.

The spring tends to maintain the gear hub in frictional driving relation to the clutch member 17 carried by shaft 6. In this function the spring is assisted by the thrust of the driving bevel gear 7 upon the driven bevel gear 8. It will be obvious, however, that if a sudden shock stops the propeller 15 and the clutch begins to slip the thrust between gears 7 and 8 will be relieved to the extent of the slippage and in consequence the frictional driving engagement between the two parts of the clutch will likewise be relieved. As a result of this arrangement the clutch will in practice be subject to little more than the pressure of spring 19 when slipping and will consequently be enabled to slip with little wear or damage to the parts. Until it is subjected to such a shock as causes it to slip, however, the clutch will be far more powerful than the pressure of spring 19 would indicate, due to the thrust between the gears.

In addition to the advantages above described it will be noted that the clutch is placed within a housing which is normally full of lubricant and in which the clutch may operate under ideal conditions so far as lubrication and inaccessibility of foreign matter is concerned. The clutch is further relieved of all shock except such as comes to it properly through the propeller and in the event that inspection or repair of the parts is desired, the clutch is readily accessible by separation of the component parts 4 and 5 of the submerged gear housing 1.

I claim:

1. The combination with the submersible gear housing of an outboard motor, and a propeller drive therethrough including a power shaft and a propeller shaft with interconnecting gearing, of a slip clutch incorporated in said drive within said housing.

2. The combination with the submersible gear housing of an outboard motor, and a propeller drive therethrough including a power shaft and a propeller shaft with intermeshed gears on said shafts, of a slip clutch incorporated in said drive within said housing and including complementary clutch members relatively movable axially of said propeller shaft and connected for rotation respectively with said propeller shaft and the gear thereon, together with a spring urging said members together in normally operative motion transmitting relation, the compression of said spring being adapted to permit relative rotative movement between said members upon shock to said propeller shaft.

3. The combination with the submersible gear housing of an outboard motor, and a propeller drive therethrough including a power shaft and a propeller shaft with intermeshed gears on said shafts, of a slip clutch incorporated in said drive within said housing and including complementary clutch members relatively movable axially of one of said shafts and connected for rotation respectively with said shaft and the gear thereon, together with a spring urging said members together in normally operative motion transmitting relation, the compression of said spring being adapted to permit relative rotative movement between said members upon shock to said propeller shaft.

4. The combination with the submersible gear housing of an outboard motor, a propeller drive therethrough including a power shaft and a propeller shaft with intermeshed driving and driven gears on the respective shafts, propeller shaft bearings in said housing spaced from said gears, and a bearing in said housing for said power shaft closely adjacent to the gear thereon, of a slip clutch incorporated in said drive within said housing and including complementary clutch members relatively movable axially of said propeller shaft, between said bearings therefore, and connected for rotation with said propeller shaft and the gear thereon, together with a spring urging said members together in normally operative motion transmitting relation, the compression of said spring being adapted to permit rotative movement between said members upon shock to said propeller shaft.

5. In an outboard motor drive, the combination with a drive shaft and a propeller shaft, of a driving bevel gear fixed to the drive shaft, a driven bevel gear rotatable upon the propeller shaft and meshing with the driving bevel gear, a clutch member on the propeller shaft adapted to receive power from said driven bevel gear and a clutch face on said driven bevel gear opposite to the teeth thereof and formed for interaction with said clutch member, whereby the thrust between said gears will tend to maintain said driven gear in operative driving engagement with said clutch member.

6. In an outboard motor drive, the combination with a propeller shaft and a clutch member fixed thereto, of a complementary clutch member rotatable upon said shaft and provided at one end with a clutch face for engagement with said first mentioned clutch member and at the other end with bevel gear teeth, a spring pressing said rotatable clutch member into driving engagement with the clutch member fixed to said shaft and a driving pinion meshing with said gear teeth and adapted to exert thereon, a thrust supplementing the pressure of said spring.

7. The combination with the upright shaft housing and submersible gear housing, of an outboard motor, of a driving shaft in said shaft housing provided with a pinion in said gear housing, a propeller shaft in said gear housing substantially at right angles to said drive shaft, a clutch member fixed to said propeller shaft, a bevel gear rotatably mounted on said propeller shaft in mesh with said pinion and provided with a clutch face engageable with said member, a helical compression spring wound upon said propeller shaft and provided with a relatively fixed seat confining it in pressure engagement with said gear, the thrust of said pinion upon said gear being exerted in the direction of said thrust member whereby to supplement the pressure of said spring, whereby the combined thrust and spring pressure maintain said gear in operative driving engagement with said clutch member and propeller shaft subject to relief of pressure when such thrust is relieved.

HERBERT J. HILLBORN.